E. A. BIDWELL.
LIQUID SEPARATOR.
APPLICATION FILED OCT. 18, 1911.
1,034,571.
Patented Aug. 6, 1912.
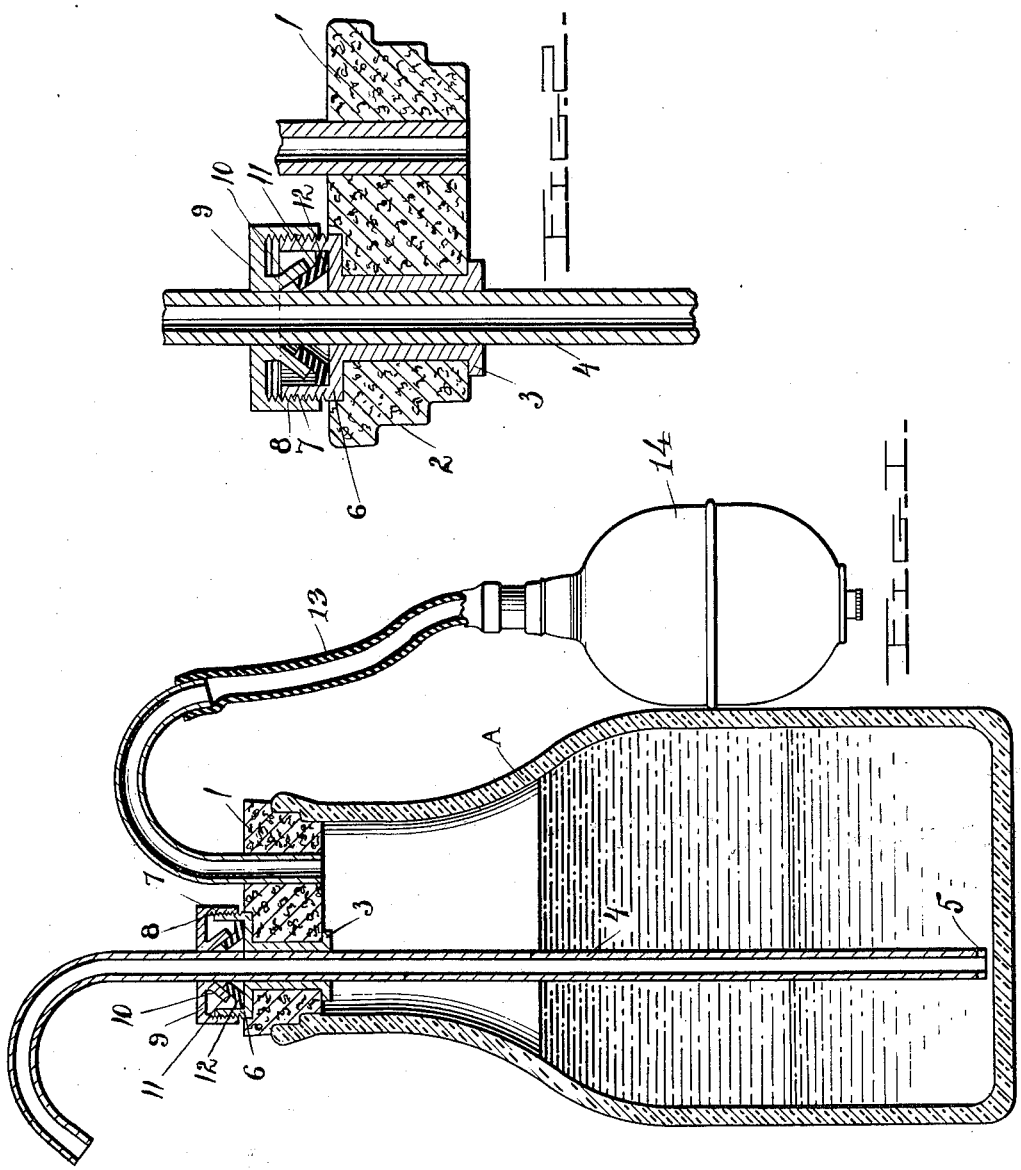
Witnesses
Carroll Bailey
Inventor
Egbert A. Bidwell,
By Victor J. Evans
Attorney

UNITED STATES PATENT OFFICE.

EGBERT A. BIDWELL, OF JEFFERSON CITY, MISSOURI.

LIQUID-SEPARATOR.

1,034,571.      Specification of Letters Patent.      Patented Aug. 6, 1912.

Application filed October 18, 1911. Serial No. 655,287.

*To all whom it may concern:*

Be it known that I, EGBERT A. BIDWELL, a citizen of the United States, residing at Jefferson City, in the county of Cole and State of Missouri, have invented new and useful Improvements in Liquid-Separators, of which the following is a specification.

This invention relates to liquid separators and particularly to a device for removing the cream from milk without disturbing the latter or vice versa.

Another object of the invention is to provide means which will include an adjustable discharging tube having coöperating elements for holding the tube in its adjusted position on the tube support or stopper, the said coöperating elements in effect forming a perfect air tight connection between the tube and the supporting stopper.

In the drawing, forming a portion of this specification and in which like numerals of reference indicate similar parts in the several views:—Figure 1 is a section taken vertically through the separator and illustrating the application of the same to a bottle. Fig. 2 is a section on an enlarged scale through the stopper and through a portion of the liquid discharging tube.

The liquid separator comprises a stopper or support 1 which may be constructed of cork, rubber or other such material which will present an effective friction surface to engage the walls of the neck of the bottle so as to form an effective air tight connection between the neck and the stopper. The bottle A shown herein is one adapted to contain milk, and as shown, the stopper 1 is provided with an inner portion 2 of a configuration to snugly fit within the neck.

The stopper has mounted therein a metal sleeve 3 and adjustable vertically therein is a milk or cream discharging tube 4. The upper end of the tube is curved outwardly and then downwardly so as to facilitate the discharge of the liquid into any suitable receiving vessel, (not shown). The lower end of the tube is provided with notched opposite side portions, the notches of which providing entrance passages 5 to permit the milk to enter the tube when the bottom of the latter is engaged against the bottom of the bottle and the device used for the purpose of extracting the milk from the cream.

The metal sleeve 3 is provided at its outer or upper end with a socket 6, the walls of which being exteriorly screw-threaded, at 7, to receive the correspondingly interiorly threaded flange 8 on the adjustable member 9. The adjustable member 9 embraces the tube 4, and as shown, said member is provided with a gasket actuating portion 10. The walls of the portion 10 are flared downwardly and outwardly and are adapted to be arranged in embracing relation with the correspondingly formed walls 11 on the expansible gasket 12. From this construction it will be seen that after the desired adjustment of the tube 4 has been obtained the member 9 can be adjusted so as to cause the actuating portion 10 to bear frictionally against the walls 11. This forces the walls 11 into effective gripping contact with the tube 4, holding the same securely against movement and providing an efficient sealing means to close the joint between the gasket and the tube.

The milk or the cream may be forced from the bottle and through the tube 4 by pressure, and in view thereof, I provide the stopper 1 with a tube 13 to which is attached a bulb 14. This bulb may be actuated manually to force the air therefrom into the bottle and above the surface of the liquid therein.

I claim:—

1. A liquid separator including a supporting stopper and an adjustable discharging tube thereon, a gasket, means for moving the gasket against the tube to hold the latter in its adjusted position, and a compression bulb fitted to the stopper.

2. A liquid separator comprising a supporting member, an adjustable discharging tube thereon, a gasket supported by the stopper and provided with a portion movable with relation to the tube and arranged in embracing relation thereto, and means on the stopper for engaging the said movable portion of the gasket and for moving the same into engagement with the tube to effect an air tight connection between the gasket and the tube and to hold the tube in its adjusted position, and a compression member supported by the tube.

3. A liquid separator comprising a stopper, a socket member thereon, a liquid discharging tube extending through the stopper and through the said socket member and being adjustable therein, a gasket located in the socket member and having a portion movable with relation to the tube, an actuating member adjustable on the socket member and having a portion adapted to engage the said movable portion of the gasket to force the same into engagement with the tube, and a compression member supported by the stopper.

In testimony whereof I affix my signature in presence of two witnesses.

EGBERT A. BIDWELL.

Witnesses:
 PETER TILLMAN,
 ANTONE NATCH.